(12) United States Patent
Paik et al.

(10) Patent No.: US 7,849,485 B2
(45) Date of Patent: *Dec. 7, 2010

(54) BROADCASTING SERVICE SYSTEM USING MOBILE COMMUNICATION TERMINAL

(75) Inventors: Woo Hyun Paik, Seoul (KR); Bae Guen Kang, Seoul (KR); Tae Jun Park, Seoul (KR); Seng Whan Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/633,739

(22) Filed: Dec. 8, 2009

(65) Prior Publication Data

US 2010/0146537 A1 Jun. 10, 2010

Related U.S. Application Data

(63) Continuation of application No. 09/617,036, filed on Jul. 14, 2000, now Pat. No. 7,634,794.

(30) Foreign Application Priority Data

Jul. 16, 1999 (KR) ................. 1999/28811

(51) Int. Cl.
H04N 5/445 (2006.01)
H04N 7/16 (2006.01)
G06F 13/00 (2006.01)
G06F 3/00 (2006.01)

(52) U.S. Cl. .......................................... 725/62; 725/39
(58) Field of Classification Search ................... 725/39, 725/62; 455/556.1–556.2, 557; 370/487
See application file for complete search history.

(56) References Cited

U.S. PATENT DOCUMENTS

| | | | |
|---|---|---|---|
| 5,444,707 A | 8/1995 | Cerna et al. | |
| 5,559,549 A | 9/1996 | Hendricks et al. | |
| 5,574,966 A | 11/1996 | Barzegar et al. | |
| 5,812,930 A | 9/1998 | Zavrel | |
| 5,878,324 A | 3/1999 | Borth et al. | |
| 6,005,565 A | 12/1999 | Legall et al. | |
| 6,006,318 A | 12/1999 | Hansen et al. | |
| 6,014,694 A | 1/2000 | Aharoni et al. | |

(Continued)

FOREIGN PATENT DOCUMENTS

KR 97055875 A 7/1997

OTHER PUBLICATIONS

IEEE 100: The Authoritative Dictionary of IEEE Standards Terms, 2000, IEEE Press, 7th ed., pp. 1158-1159.

(Continued)

*Primary Examiner*—Hunter B. Lonsberry
(74) *Attorney, Agent, or Firm*—Birch, Stewart, Kolasch & Birch, LLP

(57) ABSTRACT

A system capable of receiving a television signal and telephone signal on a mobile communication terminal. In particular, the system is capable of displaying each television broadcast on a monitor of the mobile communication terminal by receiving the video and audio signal, decoding it, and outputting it to the monitor of the mobile communication terminal. In addition, the system can transmit an EPG (Electronic Program Guide) data corresponding to a subscriber request and a selected broadcasting program in real time.

19 Claims, 6 Drawing Sheets

U.S. PATENT DOCUMENTS

| | | | |
|---|---|---|---|
| 6,104,334 | A | 8/2000 | Allport |
| 6,246,430 | B1 | 6/2001 | Peters et al. |
| 6,263,503 | B1 | 7/2001 | Margulis |
| 6,272,575 | B1 | 8/2001 | Rajchel |
| 6,437,836 | B1 | 8/2002 | Huang et al. |
| 6,459,906 | B1 | 10/2002 | Yang |
| 6,470,378 | B1 | 10/2002 | Tracton et al. |
| 6,484,011 | B1 | 11/2002 | Thompson et al. |
| 6,502,242 | B1 | 12/2002 | Howe et al. |
| 6,504,580 | B1 | 1/2003 | Thompson et al. |
| 6,754,277 | B1 | 6/2004 | Heinzelman et al. |
| 6,816,704 | B1 | 11/2004 | Fukuda |
| 6,950,624 | B2 | 9/2005 | Kim et al. |
| 2001/0008000 | A1 | 7/2001 | Kikinis et al. |
| 2001/0055978 | A1 | 12/2001 | Herrod et al. |
| 2006/0105804 | A1 | 5/2006 | Kumar |

OTHER PUBLICATIONS

Khansari et al., Low Bit-Rate Video Transmission over Fading Channels for Wireless Microcellular Systems, Feb. 1996, IEEE Transactions on Circuits and Systems For Video Technology, vol. 6, No. 1, pp. 1-11.

Hsu et al., Rate Control for Robust Video Transmission over Burst-Error Wireless Channels, May 1999, IEEE Journal on Selected Areas in Communications, vol. 17, No. 5, pp. 756-773.

Dunlop, J., Potential for compressed video transmission over the GSM HSCSD service, Jan. 16, 1997, Electronics Letters, vol. 33, No. 2, pp. 121-122.

Puri et al., MPEG-4: An object-based multimedia coding standard supporting mobile applications, 1998, Baltzer Science Publishers BV, Mobile Networks and Applications 3 (1998) 5-32, pp. 5-32.

Kumar, Rajendra, "Portable Computing and Communication Device With Central Processor Housed in a Detachable Handset", U.S. Appl. No. 60/128,138, filed Apr. 7, 1999, entire document.

BROADCASTING SERVICE SYSTEM USING MOBILE COMMUNICATION TERMINAL

The present application is a 37 C.F.R. §1.53(b) continuation of co-pending U.S. patent application Ser. No. 09/617,036 filed Jul. 14, 2000, now U.S. Pat. No. 7,634,794 which claims priority on Korean Patent Application No. 28811/1999, filed Jul. 16, 1999, the entire contents of which are hereby incorporated by reference.

BACKGROUND OF THE INVENTION

1. Field of the Invention

The present invention relates to a system which is capable of receiving a broadcasting signal and telephone signal, and watching and listening it on a mobile communication terminal, and in particular to a system which is capable of receiving a video signal and audio signal, decoding it, and displaying the decoded signal on the monitor of the mobile communication terminal.

2. Description of the Prior Art

Organic combination or link between the conventional personal mobile communication system and digital television system for maximizing advantages of the both systems are not accomplished. In addition, in the digital television system, various additional information with high quality images are only provided to digital television sets. In other words, the conventional personal mobile communication system such as a cellular phone can not transmit and receive video, audio and character information.

SUMMARY OF THE INVENTION

It is an object of the present invention to provide a broadcasting service system using a mobile communication terminal which is capable of watching television broadcasting on a mobile communication subscriber terminal, when a mobile communication network subscriber wants to watch broadcasting, the system is capable of recognizing and answering the subscriber request, providing broadcasting information, and controlling digital and analog broadcasting signals to transmit on the subscriber terminal through the mobile communication network.

The other object of the present invention is to provide a subscriber terminal, when analog and digital moving picture broadcasting signals are converted according to signal standard of the mobile communication network, which is capable of receiving and restoring the converted analog and digital moving picture information, and outputting images and sounds.

The another object of the present invention is to provide a broadcasting signal selecting mean which is capable of selecting broadcasting information, receiving and restoring the selected broadcasting signal in order to watch digital and analog television broadcasting.

The another object of the present invention is to provide a broadcasting service method using a mobile communication terminal which is capable of converting digital and analog broadcasting signals in real time according to a transmission standard of the mobile communication network, transmitting the converted broadcasting signals through the mobile communication network, watching the transmitted television signals on the subscriber terminal.

To achieve the objects, the broadcasting service system using the mobile communication terminal includes a converting mean which receives a video and audio signal provided from the moving picture information and converts the video and audio signal, and a transmitting mean which transmits the converted video and audio signal to a subscriber through a certain transmission line of the mobile communication network.

To achieve the objects of the present invention, in order to receive broadcasting signals, the mobile communication terminal includes a receiving mean which receives the digital video and audio data, a decoding mean which decodes the received digital video and audio data, and outputting mean which outputs the decoded video and audio signal.

To achieve the objects of the present invention, the mobile communication subscriber terminal includes a broadcasting reception mean which receives the broadcasting signal as a moving picture information, a communication process mean which receives, restores a call signal provided to a subscriber and outputs it through the mobile communication network, and coding-outputs a transmitting call signal through the mobile communication network, a decoding mean which restores the received broadcasting signal by the broadcasting reception mean, an output mean which outputs the broadcasting signal restored by the decoding mean to a terminal to be watched, a selecting mean which selects the broadcasting signal reception mode and mobile communication call mode.

To achieve the objects of the present invention, the broadcasting service method using the mobile communication terminal includes a converting process which converts the broadcasting signal having the digital video and audio data into a data agreed with the signal and transmission standard of the mobile communication network, and a transmission process which transmits the converted digital video and audio data to the subscriber through a certain transmission channel of the mobile communication network.

BRIEF DESCRIPTION OF THE DRAWINGS

FIG. 8 is a flow chart illustrating the control process of the broadcasting service of the present invention.

DETAILED DESCRIPTION OF THE PREFERRED EMBODIMENTS

Figure 1:
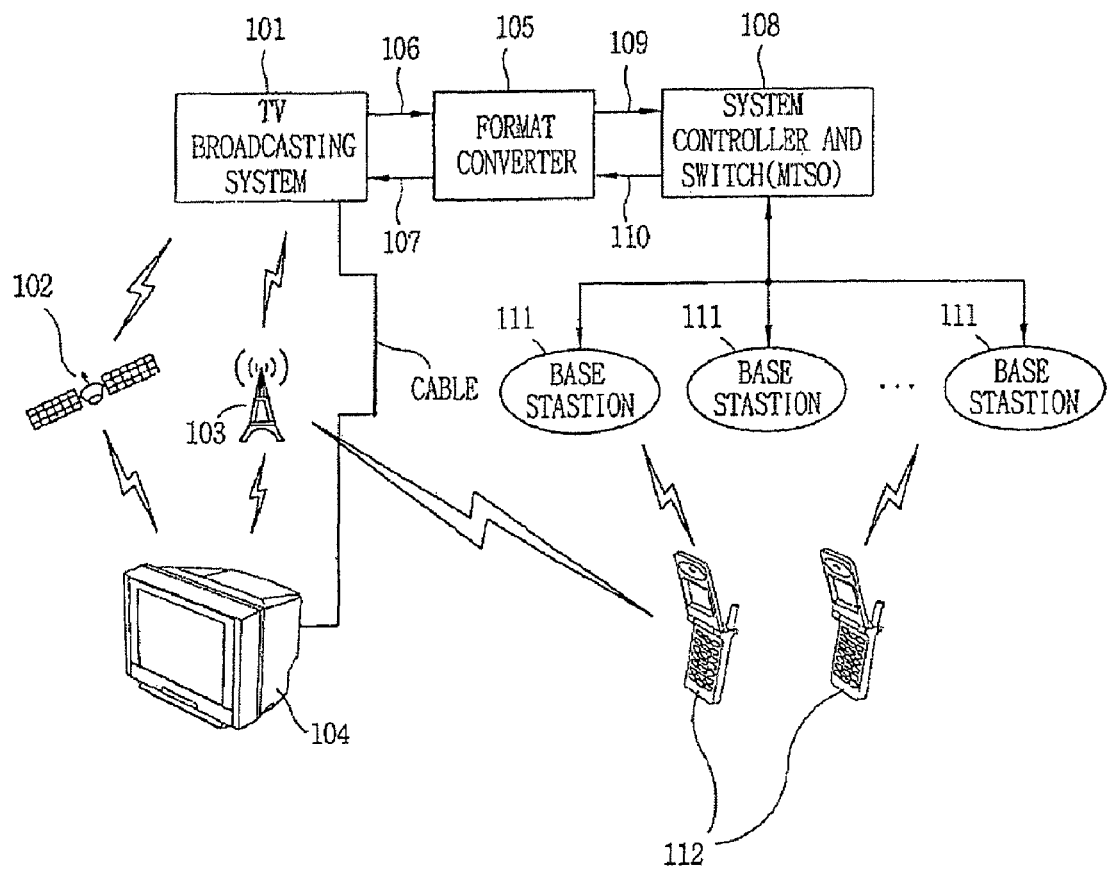
FIG. 1 is a schematic block diagram illustrating the structure of a broadcasting service system using a mobile communication terminal according to the preferred embodiment of the present invention.

FIG. 1 is a schematic block diagram illustrating the structure of a broadcasting service system using a mobile communication terminal of the preferred embodiment of the present invention. As depicted in FIG. 1, a television broadcasting system 101 transmits a video and audio signal to a subscriber terminal 104 through a satelite network 102, a television broadcasting network 103 or a cable network (Cable). The subscriber terminal 104 receives the video and audio signal, and outputs an image and sound by decoding the video and audio signal.

Herein, the television broadcasting system 101 is moving picture and audio information, it may be an analog television broadcasting system, digital television broadcasting system, or other moving picture information.

The conventional analog broadcasting system includes a NTSC (National Television System Committee), a PAL (Phase Alternation Line), and a SECAM (Sequenctial Couleur Avec Memoire) broadcasting method which are commonly used.

And the conventional digital broadcasting system includes a ATSC (Advanced Television Systems Committee) method of America, a DVB (digital Video Broadcasting) method of Europe, and a digital broadcasting method of Japan. Herein, the ATSC method of America adopts a MPEG2 (Moving Picture Experts Group2), Dolby AC3 and 8VSB, and DVB method of Europe adopts a MPEG2 (Moving Picture Experts Group2) and an OFDM (Orthogonal Frequency Division Multiplexing).

As described above, in the digital television broadcasting system, the video and audio signal are provided as a compressed digital data (bit stream). Herein, the compressed digital data has a protocol in relation to reception and transmission, accordingly the digital broadcasting information agreed with the protocol includes the video and audio data and EPG (Electronic Program Guide) and additional data, and are processed together.

In FIG. 1 of the present invention, processing of the digital video signal compressed as the MPEG2 (Moving Picture Experts Group2) is described.

When the television broadcasting system 101 is the digital television broadcasting system, the video information provided to the digital television is a compressed-encoded information as the MPEG2 (Moving Picture Experts Group2) standard, accordingly a format converter 105 for converting the compressed-encoded information into a MPEG4 (Moving Picture Experts Group4) agreed with an image standard of the mobile communication network is included.

Meanwhile, when the television broadcasting system 101 is the analog television broadcasting system, the television broadcasting system 101 (moving picture provider) or the format converter 105 can have a converting mean which converts the provided video information into a digital signal having a certain format agreed with the mobile communication network transmission standard.

The format converter 105 is inputted the MPEG2 (Moving Picture Experts Group2) videotex provided from the television broadcasting system 101, and format-converts the MPEG2 videotex into the MPEG4 (Moving Picture Experts Group4) videotex agreed with the mobile communication network.

The format converter 105 will be described with reference to the accompanying FIG. 5B.

The format converter 105 can convert the MPEG2 (Moving Picture Experts Group2) videotex into H.26L, H.263 or H.26X format. As far as the converted format agrees with the mobile communication network, there is no limitation in the format.

The format converter 105 exchanges the information needed in the format conversion with the television broadcasting system 101 through a transmission line 107.

The format converter 105 will be described in detail.

For example, the bit rate of the digital television adapts high speed broadcasting band such as 19.236 Mbps of HD level or 6 Mbps of SD level.

However, the data transmission rate of IMT-2000 is maximum 144 Kbps or 2 Mbps (in case of a Pico Cell) according to a Cell, likewise, on the mobile communication network which can process maximum 2 Mbps two-way signal, transmitting the digital television signal directly to a cellular phone or PCS is impossible due to the distinctive character of the mobile communication network.

Therefore the format converting process which converts the MPEG2 digital television signal into the signal agreed with the mobile communication network such as the MPEG4 (Moving Picture Experts Group4) is required, the format converter 105 performs transcoding of the video and audio data, formats and converts the EPG and additional information of the digital television information to make the signals agree with the mobile communication network.

The converted digital video and audio data information are provided to a MTSO (System Controller and Switch) 108 through a transmission line 109. The MTSO 108 provides a signal for answering a request from a subscriber to the format converter 105 through a transmission line 110, allots the digital video and audio information to a certain channel of the mobile communication network, and transmits the digital information as a RF frequency to a subscriber terminal 112 through a base station.

As described above, the video and audio signal of the television broadcasting system 101 are converted into the signal agreed with the mobile communication network, and are transmitted to the subscriber terminal 112. Accordingly it is possible to watch the television broadcasting on the subscriber terminal (cellular phone, PCS, IMT-2000 terminal).

Figure 2:
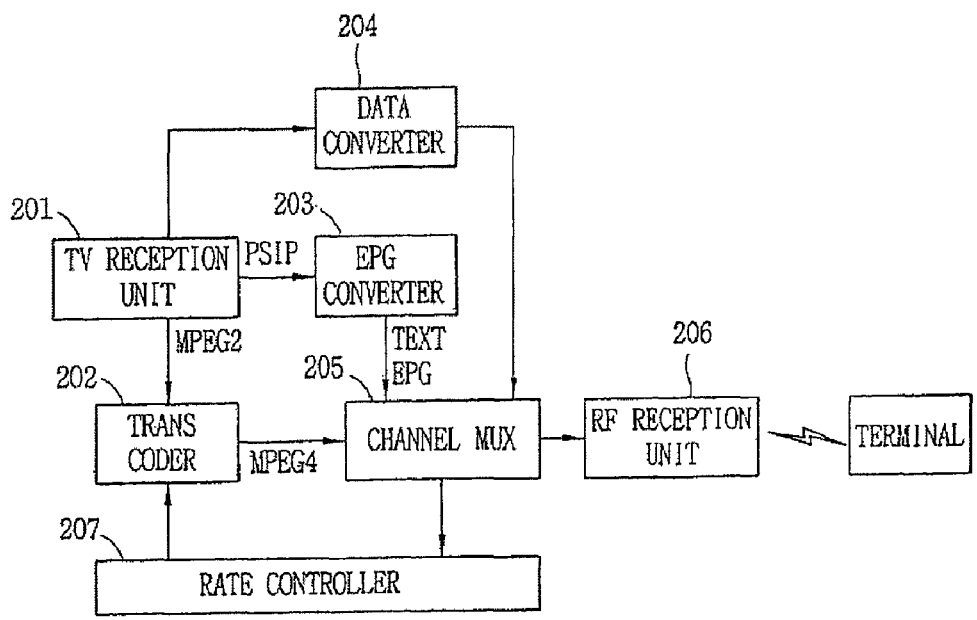
FIG. 2 is a block diagram illustrating the broadcasting service system using the mobile communication terminal according to the preferred embodiment of the present invention.

FIG. 2 is a block diagram illustrating the operation of the broadcasting service system using the mobile communication terminal of the present invention, it depicts the preferred embodiment of the system including the format converter 105 and the server (MTSO) 108 and the base station 111.

When a moving picture information is the digital television broadcasting system, a television reception unit 201 receives the additional information including the digital video, audio information and the EPG (Electronic Program Guide) data agreed with the digital television broadcasting system, and transmits the MPEG2 (Moving Picture Experts Group2) signal to a transcoder 202. The television reception unit 201 abstracts the EPG (electronic Program Guide) data and transmits it to a EPG converting unit 203, and abstracts the additional data and transmits it to a additional data converting unit 204.

The transcoder 202 converts the inputted MPEG2 (Moving Picture Experts Group2) digital video and audio data into the MPEG4 (Moving Picture Experts Group4) digital video and audio data, and transmits it to a channel multiplexer 205.

As the digital video data transmission medium are diversified, and the characters of each medium are different, accordingly there is a need to make bit rate and converting method of the digital image agree with the medium character during the transmission.

In particular, the system of the present invention provides the digital television broadcasting signal to the mobile communication terminal such as the cellular phone or PCS through the mobile communication network, accordingly transcoding for converting the compressed bit is adapted in order to transmit the digital video data to the medium having different band.

The EPG converting unit 203 decodes the inputted MPEG2 EPG data, and converts it into the MPEG4 EPG data.

The additional data converting unit 204 decodes the inputted MPEG2 additional data into the MPEG4 additional data.

The EPG and additional data can be converted into the data agreed with a wireless internet network.

The channel multiplexer 205 puts the MPEG4 video and audio data provided from the transcoder 202 on a certain allotted channel, at the same time puts the EPG data outputted from the EPG converting unit 203 and the additional data outputted from the additional data converting unit 204 on a certain allotted channel.

The MPEG4 (Moving Picture Experts Group4) digital television video, audio, EPG (electronic Program Guide) and additional information converted in accordance with the character of the mobile communication network by passing through the above process are transmitted to the subscriber mobile communication terminal through a RF (Radio Frequency) reception unit 206.

Herein, the RF reception unit 206 is corresponding to the server (MTSO) or base station of the mobile communication network.

In SD level of the MPEG2 (Moving Picture Experts Group2), 6 Mbps band is required, in HD level, about 19 Mbps band is required, when the MPEG2 is converted into the MPEG4 (Moving Picture Experts Group4), moving picture can be transmitted as about 64 Kbps bit rate. Herein, the moving picture can be transmitted by being allotted a part of the IMT-2000 band as a television broadcasting band.

Meanwhile, when moving picture information is transmitted as a packet in order to transmit the moving picture information through exclusive broadcasting channel (transmission line), in consideration of the character of the mobile communication network, a voice band is changeable on one base station in accordance with a subscriber telephone call quantity, at this time television broadcasting information should not be taken all band, accordingly a band controlling method for changeable band allotment is required.

When a BW-video means moving picture (including sound) band for the digital television broadcasting and a BW-audio means audio band for voice communication of the mobile communication terminal, the size of the audio band changes from 0 to maximum BW-audio in accordance with the voice telephone call quantity.

Accordingly, the channel multiplexer 205 provides voice telephone call quantity information to a transmission rate control unit 207 in accordance with the voice telephone call quantity, the transmission rate control unit 207 controls encoding rate of the MPEG4 (Moving Picture Experts Group4) of the transcoder 202 by using the provided information from the channel multiplexer 205.

In addition, as described above, the digital television broadcasting can service not only the video and audio information, but also additional information, the additional information is provided to a subscriber through the additional information converting unit 204 and channel multiplexer 205.

Figure 3:
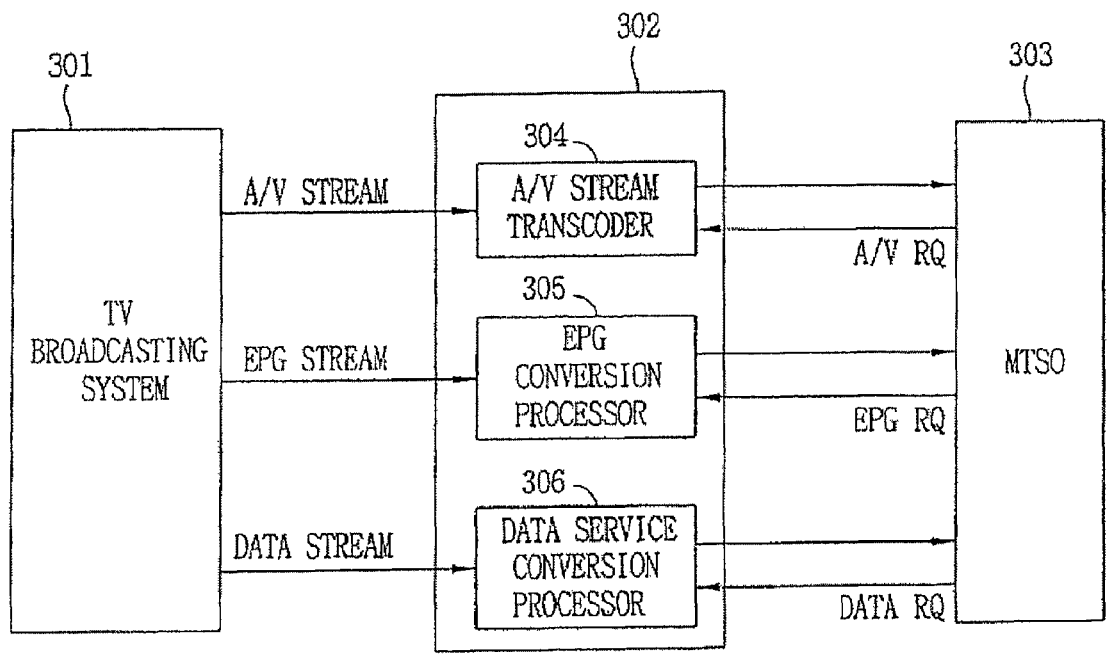
FIG. 3 is a block diagram illustrating the operation of the format converter of the present invention.

FIG. 3 is a block diagram illustrating the preferred embodiment of the format converter of the present invention, it shows the construction of the format converting system which comprises a transcoder, a EPG (Electronic Program Guide) data converting unit and a data service converting processor.

Herein, a format converter 302 for converting the signal inputted from the television broadcasting system 101 301 into the signal agreeable to a mobile communication network 303 includes an A/V stream transcoder 304 which receives an A/V stream from the television broadcasting system and converts it into the format agreed with the mobile communication network, an EPG converting processor 305 which receives an EPG (Electronic Program Guide) stream from the television broadcasting system and converts it into the format agreed with the mobile communication network, and a data service converting processor 306 which receives a data stream from the television broadcasting system and converts it into the format agreed with the mobile communication network.

First, the A/V stream transcoder 304 converts the MPEG2 (Moving Picture Experts Group2) digital video (including audio) information into the MPEG4 (Moving Picture Experts Group4) or H.26L, H.263, H.26X format, and provides it to the mobile communication network 303. Herein, the converted digital video data can be provided to the subscriber in accordance with a subscriber request (A/V RQ) of the mobile communication network 303.

The EPG converting processor 305 converts the MPEG2 EPG stream inputted from the television broadcasting system into the signal agreed with the mobile communication network.

Figure 4:
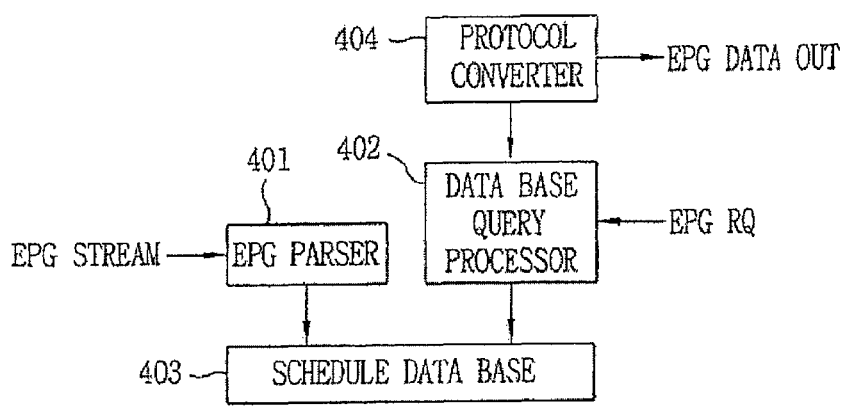
FIG. 4 is a block diagram illustrating the operation of the EPG (Electronic Program Guide) converting processor of the present invention.

FIG. 4 is a block diagram illustrating the embodiment of the EPG converting processor of the present invention. As depicted in FIG. 4, the EPG converting processor 305 inputs the EPG information inputted from a PSIP (Program Stream Internet Protocol) table, performs format-decoding, abstracts needed information such as transmission rate of program or bit by filtering the format-decoded information, format-converts the abstracted information, and constructs it in order to satisfy a wireless data protocol.

Herein, format-conversion in WAP (wireless Application Protocol), PSIP (Program Stream Internet Protocol) text is converted into HDML (Handheld device Mark-up Language) or TTML (Tagged Text Mark-up Language). In format-conversion in wireless data protocol, the PSIP is converted into HDTP (Handheld Device Transport Protocol) or ITTP (Intelligent Terminal Transfer Protocol).

As depicted in FIG. 4, it illustrates an EPG analysis unit 401, an EPG answering control unit 402, a schedule data base 403, and a protocol converter 404.

First, the EPG analysis unit 401 analysis the inputted EPG guide stream according to a encoded format, abstracts information in relation to channel and schedule of broadcasting programs, and stores the abstracted result on the schedule data base 403.

The schedule data base 403 records and stores the inputted information from the EPG analysis unit 401 on a memory, and checks and outputs a certain information of the data base in accordance with a request from the EPG answering control unit 402.

The EPG answering control unit 402 operates in accordance with the EPG answering request (EPG RQ) from the subscriber through the server MTSO 303, searches the information corresponding to the subscriber request on the schedule data base 403, and transmits it to the protocol converter 404.

The protocol converter 404 converts the data inputted from the EPG answering control unit 402 into a format agreed with the MTSO 303 and outputs it to the MTSO 303 for answering the subscriber request and being watched by the subscriber on the mobile communication terminal.

Meanwhile, the service converting processor 306 is inputted the additional information (data stream) from the television broadcasting system 301, converts it into a format agreed with the mobile communication network, and provides the information corresponding to the subscriber request (Data RQ).

In other words, the data service converting processor 306 performs the bit rate and protocol conversion process which converts the digital television broadcasting contents into the contents format agreed with the mobile communication network.

For example, the service information of the digital television broadcasting system is decoded by a MHEG-5 engine or XHTML browser, and the decoded information is converted into the signal and format agreed with the mobile communication network.

Herein, in the WAP conversion, Carousel/IP Datagram is converted into HDTP (High definition transport Protocol), and MHEG/XHTML (Multimedia and Hypermedia Expert Group/XHyper Text Markup Language) is converted into HDML (Handheld Device Mark-up Language).

Figure 5A:
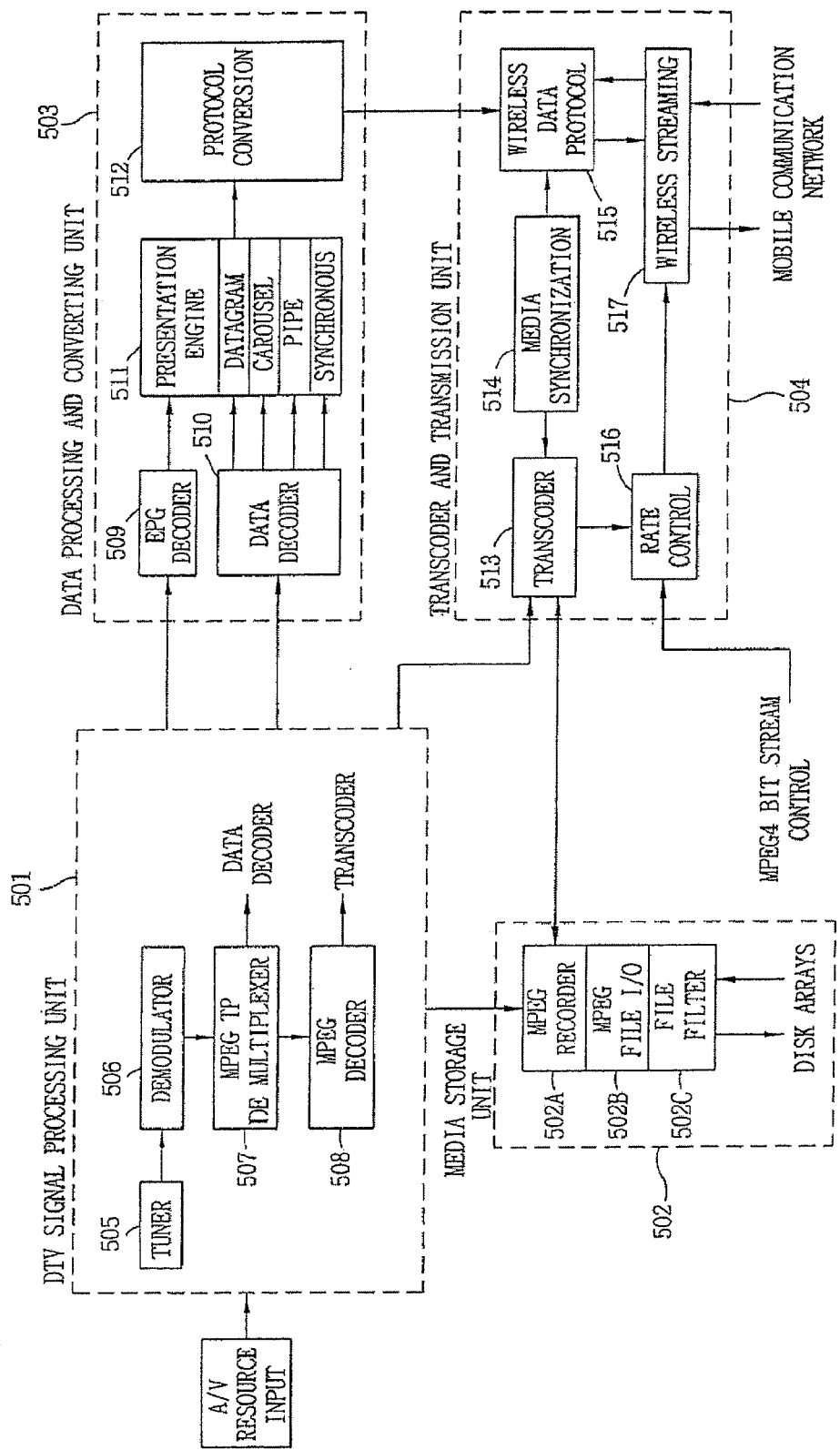
FIG. 5A is a block diagram illustrating the operation of the digital broadcasting service system of the present invention in relation to a video and audio information process and mobile communication network matching.

FIG. 5A is a block diagram illustrating the operation of the preferred embodiment of the digital broadcasting service system in relation to processing of video, audio and additional information and matching with the mobile communication network of the present invention.

As depicted in FIG. 5, the digital broadcasting system using the mobile communication comprises a digital signal processing unit 501, a medium storing unit 502, a data processing/converting unit 503, and a transcoder/transmission unit 504. Its operation will be described in detail.

The digital signal processing unit 501 is a information program transmission unit which provides broadcasting program to the mobile communication network by receiving 19.2 Mbps HD level and 6 Mbps SD level multi-channel digital television signal.

The digital signal processing unit 501 selects the inputted digital television signal on a tuner 505, demodulates the selected signal on a demodulating unit 506, abstracts information in accordance with each broadcasting channel on a de multiplexer 507, reproduces and outputs the video and audio signal as the original digital television broadcasting signal by a MPEG decoder 508.

Herein, the MPEG TP de multiplexer 507 abstracts the data regardless of the format for providing PSI (Program System Information), guide information and additional information.

The medium storing unit 502 includes a MPEG recorder 502A, a MPEG file input/output unit 502B and a file filter 502C, it is a file system to make a disk scheduling and disk data block size agree with the MPEG stream for storing digital television broadcasting signal maximum 30 Mbps level MPEG2 stream in real time. The medium storing unit 502 stores a stream such as the MPEG4 itself, and services it to the mobile communication network.

Herein, a striping method is used to store the MPEG2 transmission stream transmitted from the digital television broadcasting signal reception unit as a consecutive block unit. The transcoder 513 may support GOP unit, I-Frame Value on the file system in order to operate effectively a Bit Rate Drop, Macro Block and Infra/Inter compensation.

A data processing/converting unit 512 includes an EPG decoder 509, a data decoder 510, a presentation engine unit 511, and a protocol converting unit 512. As described above, the data processing/converting unit 512 abstracts and converts the EPG and additional information received from the digital television broadcasting for being used by a mobile communication terminal user.

The EPG decoder 509 abstracts and decodes the EPG data inputted from the digital signal processing unit 501.

The presentation engine unit 511 contents-format-converts the decoded EPG data, and outputs it to the protocol converting unit 512.

Herein, as described above, the format conversion in the WAP (Wireless Application Protocol), PSIP (Program Stream Internet Protocol) text is converted into HDML (Handheld Device Mark-up Language) or TTML (Tagged Text Mark-up Language), and in the wireless data protocol, PSIP (Program Stream Internet Protocol) is converted into HDTP Handheld Device Transport Protocol), ITTP (Intelligent terminal Transfer Protocol).

The data decoder 510 abstracts and decodes the additional service information from the inputted data.

In addition, the presentation engine unit 511 contents-format-converts the decoded additional service information, and outputs it to the protocol converting unit 512.

Herein, in wireless internet WAP converting, Carousel/IP Datagram agrees with HDTP, and MHEG/XHTML agrees with HDML.

The protocol converting unit 512 converts the additional information including the format-converted EPG data into a protocol agreed with the mobile communication network, and outputs it.

The transcoder 513 converts the digital video (including audio) broadcasting signal inputted from the digital signal processing unit 501 into the signal agreed with the mobile communication network. For example, it can convert the MPEG2 into the MPEG4, and provides the converted digital video and audio data to a wireless stream processing unit 517 in accordance with transmission control of a transmission rate control unit 516.

Figure 5B:
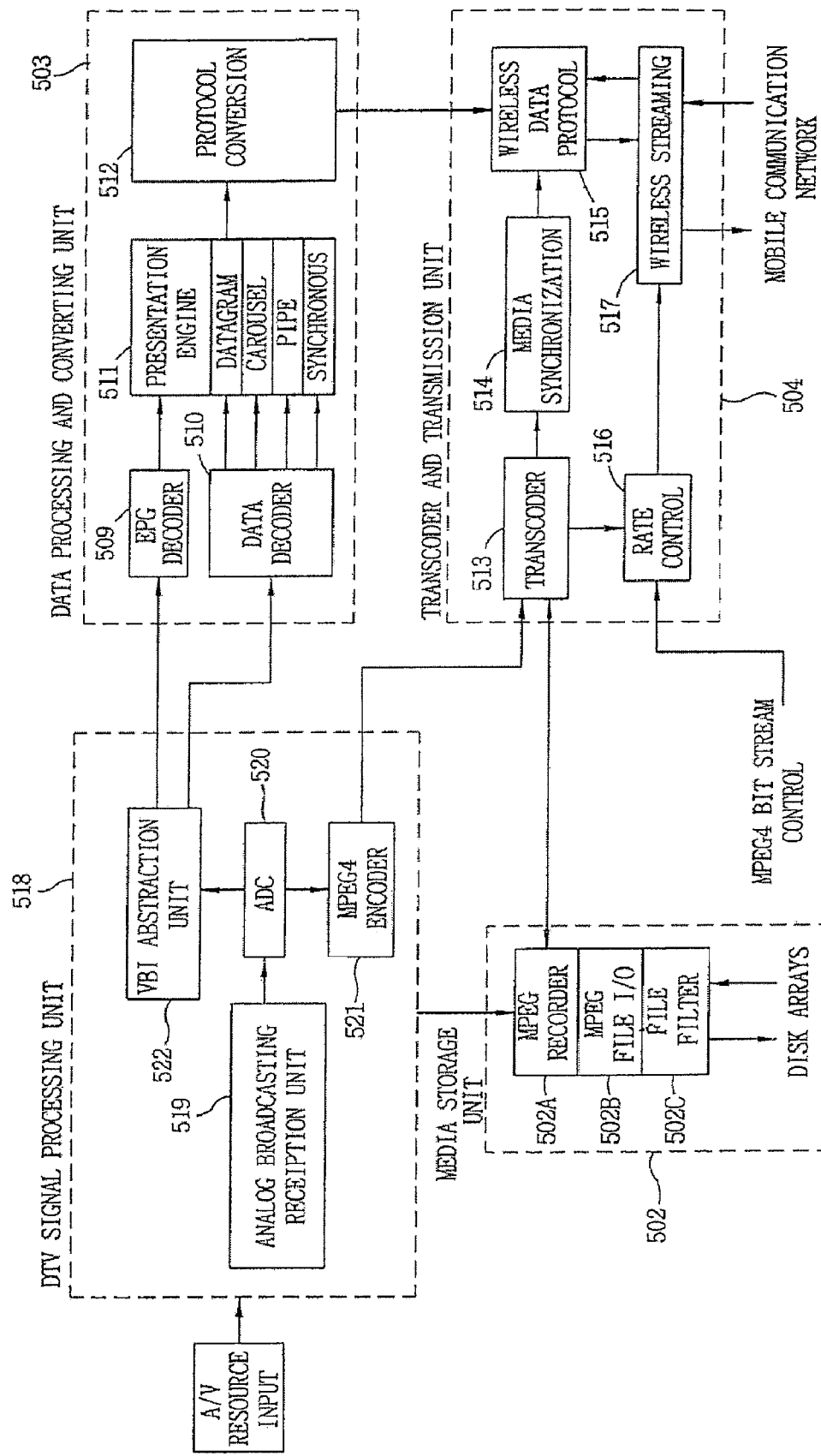
FIG. 5B is a block diagram illustrating the operation of the analog broadcasting system of the present invention in relation to a video and audio information process and mobile communication network matching.

FIG. 5B is a block diagram illustrating the analog broadcasting service system in relation with processing of video, audio and additional information and matching with the mobile communication network. As depicted in FIG. 5B, the analog television broadcasting system using the mobile communication comprises an analog signal processing unit 518, the medium storing unit 502, the data processing/converting unit 503 and the transcoder/transmission unit 504, It will be described in detail.

The medium storing unit 502, data processing/converting unit 503 and transcoder/transmission unit 504 are same in FIG. 5A, description of the parts are abridged.

The analog signal processing unit 518 includes an analog broadcasting signal reception unit 519, an analog digital converting unit 520, a MPEG4 encoder 521, and a VBI abstraction unit 522. Herein, the analog signal processing unit 518 is information program transmission unit for receiving the analog television signal and providing the broadcasting program to the mobile communication network.

In addition, the analog signal processing unit 518 includes an analog broadcasting reception unit 519 which receives and restores the analog television signal, an analog digital converting unit 520 which converts the restored analog broadcasting signal (including moving picture and audio information) into a digital data, a MPEG4 encoder 521 which converts the converted digital data into MPEG4 (Moving Picture Experts Group4) format and outputs it to the transcoder/transmission unit 504, and the VBI abstraction unit 522 which abstracts the EPG (Electronic Program Guide) data and additional data on the VBI section and provides it separately to the EPG decoder 509 and the additional data decoder 510.

Description of the operation of the above construction is same with description of FIG. 5A, and is abridged.

Accordingly, when the moving picture information is the analog television broadcasting signal, broadcasting service using the mobile communication is possible.

Figure 6:
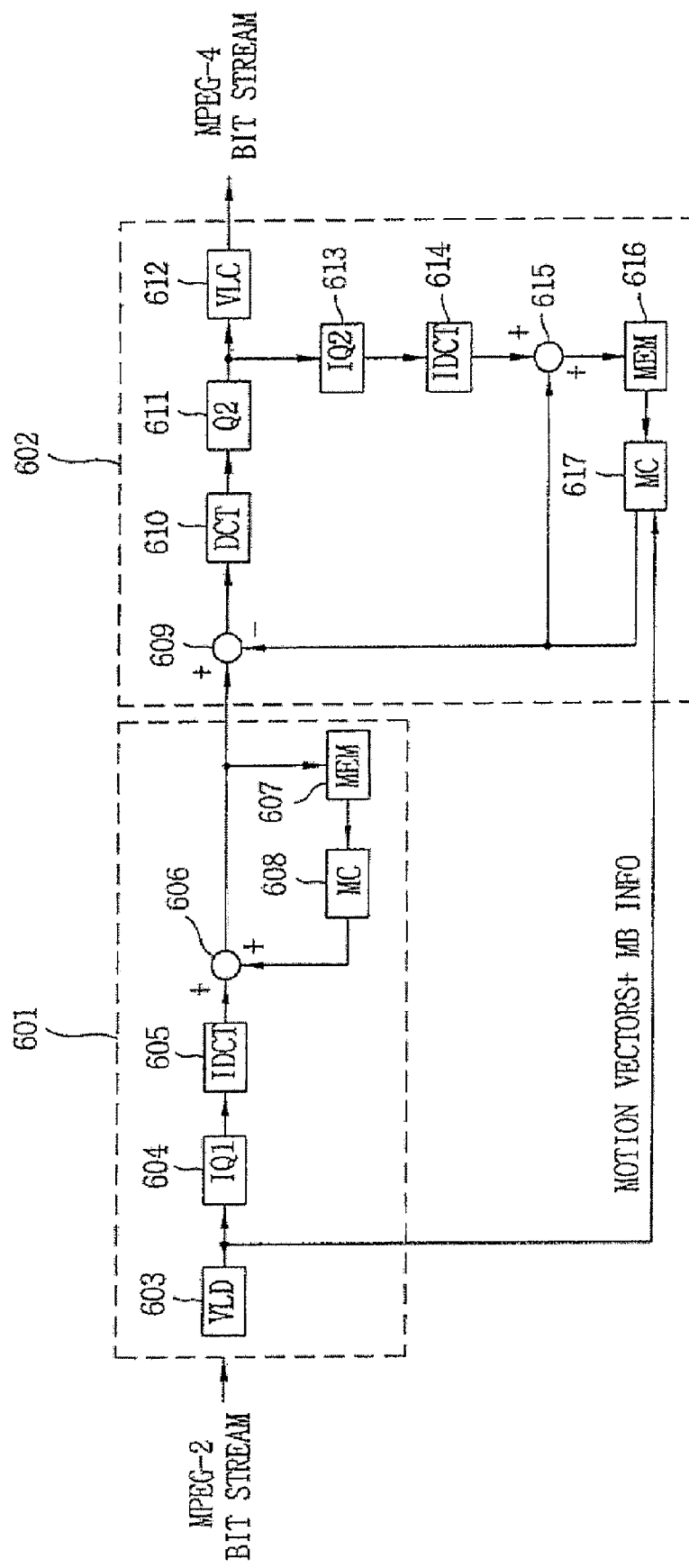
FIG. 6 is a block diagram illustrating the operation of the transcoder of the present invention.

FIG. 6 is a block diagram illustrating the operation of the transcoder of the present invention for converting the MPEG2 (Moving Picture Experts Group2) into the MPEG4 (Moving Picture Experts Group4).

As depicted in FIG. 6, when H.26L, H.263, H.26X are the digital video and audio data formats agreed with the mobile communication network, a construction of a circuit and algorithm for converting these formats is possible.

As described above, in order to transmit television broadcasting signal by using a wireless communication network in real time, the television broadcasting signal has to agree with the character of the wireless communication network. In other words, transcoding has to be performed between the different systems. Herein, in order to prevent video(image) deterioration due to the transcoding, a certain pertinent transcoding method can be selected between wide-spread transcoding methods.

In addition, not passing through the transcoding, transmitting digital television broadcasting information is possible by using the digital compressed algorithm such as MPEG4 (Moving Picture Expert Group4) or H.263.

The circuit of FIG. 6 includes a decoder unit 601 which is inputted the MPEG2 (Moving Picture Experts Group2) bit stream and decodes it, and encoder unit 602 which encodes the decoded restoration digital video data into the MPEG4 (Moving Picture Experts Group4) bit stream, its operation will be described in detail.

First, the decoded video data on a variable signal decoder 603 of the decoder unit 601 is converted into reverse quantization and IDCT (Inverse Discrete Cosine Transform) through a reverse quantization unit 604 and IDCT Inverse Discrete Cosine Transform) unit 605. The converted reverse quantization and IDCT are decoded perfectly by passing through motion compensation process of the output device including an adder 606, a memory 607 and a motion compensation unit 608.

The encoding unit 602 encodes the restored digital video data according to quantization step which is different with the above decoding quantization step (in the present invention, the MPEG2 (Moving Picture Experts Group2) is converted into the MPEG4 (Moving Picture Experts Group4), quantization step of the encoder is lager than quantization step of the decoder), the digital compressed video data coated with the MPEG4 is outputted.

In order to compress and process the digital video data, the encoder unit 602 discrete-cosine-converts the difference between inputted video and restored video outputted through an adder 609, a DCT (Discrete Cosine Transform) unit 610 outputs it, a quantization unit 611 makes the signal inputted from the DCT unit 610 quantized, a variable signal encoder 612 converts the quantized signal into the MPEG4 bit stream and outputs it, the outputted data from the quantization unit 611 is restored through the reverse quantization unit 613 and IDCT (Inverse Discrete Cosine Transform) unit 614, the balance between the restored video data and the inputted video data of the adder 609 is calculated by passing through the motion compensation process of the adder 615, memory 616 and a motion compensation unit 617, the calculated balance is discrete-cosine-transformed and quantized.

Accordingly, the transcoded data by the above process is inputted to a transmission rate control unit 516 in FIG. 5A, 5B, is controlled as transmission rate agreeable to the mobile communication network, and is inputted to a wireless network stream processing unit 517.

Meanwhile, a wireless network data protocol processing unit 515 designates a data protocol agreeable to the mobile communication network such as a HDTP (High Definition Transport Protocol) or a ITTP (Intelligent Terminal Transfer Protocol) on the WAP (Wireless Application Protocol) to the EPG (Electronic Program Guide) data and additional data outputted from the protocol converting unit 512 of the data processing/converting unit 503.

When the mobile communication terminal requires a search for a certain broadcasting schedule by sending a key word such as an program title or an actor name, the wireless network data protocol processing unit 515 supports the data base of the presentation engine unit 511 to search easily the program schedule or the program concept.

The medium synchronization control unit 514 reconstructs the transcoded video and audio data by the transcoder 513 and the converted data by the data processing/converting unit 503, and provides the data which does not require synchronization directly to the wireless stream processing unit 517.

In other words, the medium synchronization control unit 514 resynchronizes the lost synchronization information of the synchronized broadcasting data with the closest video and audio data through the transcoder 513.

As described above, the reconstructed digital video, audio and additional information agreed to the mobile communication network are inputted to the wireless stream processing unit 517.

The wireless stream processing unit 517 transmits the moving picture and data to pertinent channel of the mobile communication network in real time, performs channel allot or cancel in relation to the digital television signal transmission for answering request of the subscriber.

Figure 7:
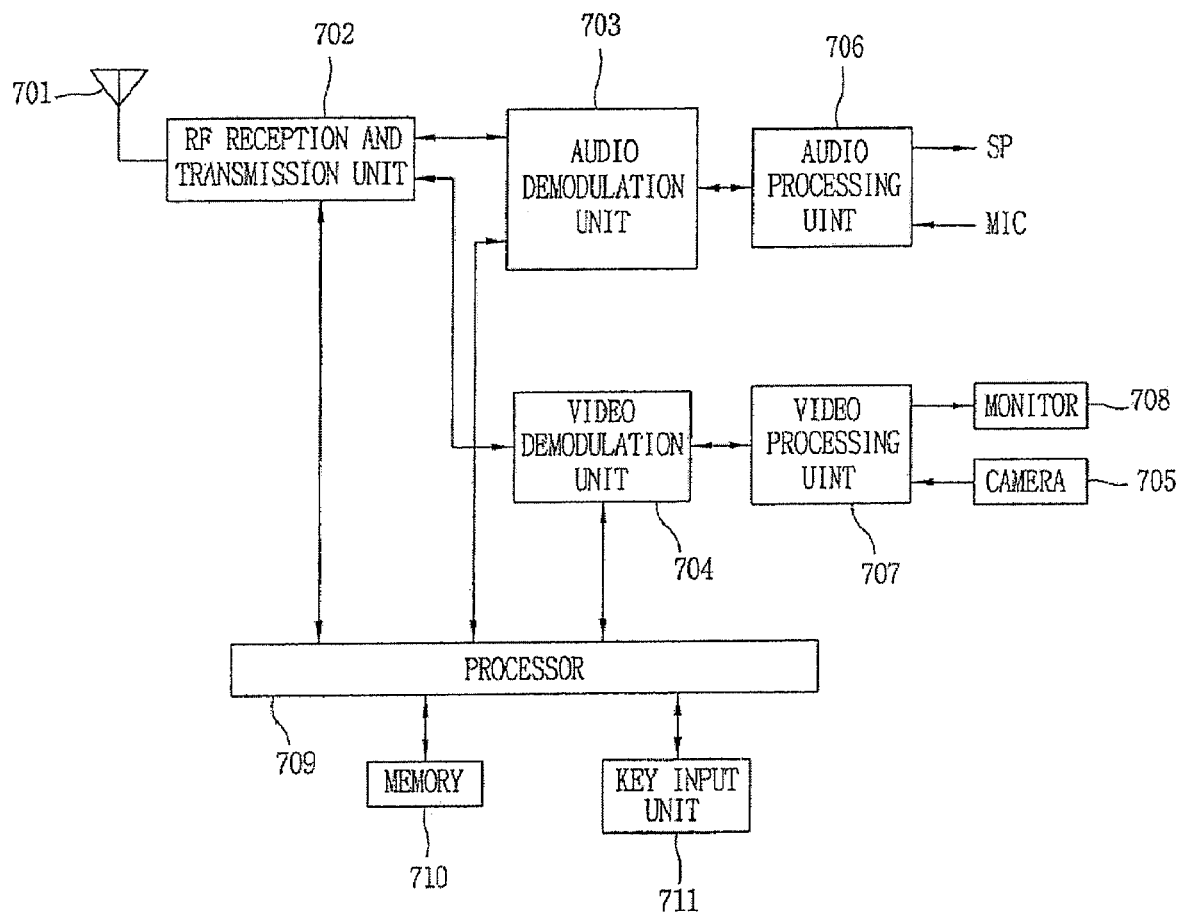
FIG. 7 is a block diagram illustrating the operation of the mobile communication terminal of the present invention.

FIG. 7 is a block diagram of the preferred embodiment of the mobile communication terminal of the present invention, it describes the construction of the mobile communication terminal receiving the television signal transmitted from the mobile communication network. Its construction and operation will be described in detail.

First, a RF reception and transmission unit 702 receives and transmits the base station communication signal received from an antenna 701 and the signal for voice telephone call communication, and receives the television broadcasting signal transmitted to pertinent call channel.

In the voice telephone call communication, a voice encoding and decoding unit 703 duplicates the received voice signal of the opponent caller received from the RF reception and transmission unit 702, and outputs it to a voice processing unit 706.

The voice processing unit 706 outputs the duplicated voice signal to a speaker SP, encodes the duplicated voice signal through a microphone MIC of the subscriber, and transmits it to the RF reception and transmission unit 702.

A video encoding and decoding unit 704 performs a MPEG4 decoder function. In the preferred embodiment of the present invention, the MPEG decoder is included in order to reproduce the transcoded MPEG4 (Moving Picture Experts Group4) video data which is transmitted through the mobile communication network, but a H.263 codec may be included in the IMT-2000 in accordance with circumstance of the mobile communication network.

Accordingly, in order to process moving picture information as a format agreed with the mobile communication network, various encoding standard codec can be included.

In the television broadcasting reception mode, the video encoding and decoding unit 704 receives the MPEG4 (Moving Picture Experts Group4) digital video signal inputted from the RF reception and transmission unit 702, restores it, and outputs the restored television video signal to a monitor 708 through a video processing unit 707.

In the mobile communication system having two-way monitor communication function, a camera 705 transmits a signal having the photographed subscriber image by passing through the video processing unit 707, video encoding and decoding unit 704, and RF reception and transmission unit 702.

A processor 709 having the voice telephone call mode and television reception mode controls the each construction unit in accordance with the mode, reads information on a memory unit 710, and stores information on the memory unit 710.

A key input unit 711 has designated keys for the television reception with a key input function for telephone calls.

FIG. 7 is a block diagram illustrating the operation of the mobile communication terminal of the present invention, when the television broadcasting signal is converted into the signal agreed with the mobile communication network, the mobile communication terminal receives it, restores it into video and audio, and outputs it.

However, as described above, when the RF reception and transmission unit 702 includes a TV tuner, although the television signal is not converted into a signal agreed with the signal transmission standard of the mobile communication network, the mobile communication terminal of the present invention can receive the analog or digital television broadcasting signal, restores it and outputs it.

Herein, in the subscriber mobile communication terminal which receives the analog television broadcasting signal, the RF reception and transmission unit 702 performs a tuner function which receives the analog television broadcasting signal from the antenna 701 and selects it, the voice processing unit 706 processes the voice signal of the selected channel broadcasting signal of the RF reception and transmission unit (hereinafter referred to tuner) 702, and the video processing unit 707 processes the video signal of the selected channel broadcasting signal, and outputs it to the monitor 708 in order to display.

As described above, the subscriber mobile communication terminal receiving the analog television broadcasting signal includes the antenna, the tuner, the video and audio processing unit, in FIG. 7, the video and audio encoding and decoding unit can be excluded. As for the antenna, speaker, and monitor of the above construction, the antenna, speaker, and monitor of the conventional cellular phone, PCS, and IMT-2000 terminal can be used.

Meanwhile, in the subscriber mobile communication terminal, the RF reception and transmission unit (tuner) 702 receives the digital television broadcasting signal from the antenna 701 and selects it, the voice decoding unit 706 outputs the restored voice signal to the speaker SP, the video decoding unit 704 restores the video signal of the selected digital broadcasting signal, and the video processing unit 707 processes the restored video signal and outputs it to the monitor for displaying.

As described above, the subscriber mobile communication terminal includes decoding mean which decodes the digital video and audio signal, the antenna, speaker and monitor of the conventional PCS, cellular phone and IMT-2000 terminal can be used as it is.

FIG. 8 is a flow chart illustrating the control operation of the broadcasting service of the present invention, it shows a certain process for the receiving television signal between the terminal of FIG. 7 and the broadcasting service system using the mobile communication of the present invention.

In FIG. 7 and FIG. 8, operations will be described. The EPG data is transmitted to the subscriber for answering the subscriber request, the format-converted signal based on the EPG data is transmitted to the subscriber in accordance with the subscriber select program through the allotted channel.

At the same time, a bill is demanded to the subscriber, it is assumed the subscriber has right to watch the digital television broadcasting. It is also assumed a mobile communication company has a designated telephone number to handle subscriber requests and also performs key word certifying process for confirming the subscriber.

First, when the mobile communication terminal subscriber wants to receive the digital television broadcasting through the subscribed mobile communication network, the subscriber sets up the TV reception mode by using the key input unit 711, and connects to the designated telephone number of the mobile communication company.

After the connection completion, the subscriber is confirmed whether the certified subscriber having the right for receiving the digital television broadcasting by inputting the pass word.

When the subscriber is certified, access is granted, the pertinent channel for watching moving picture is allotted.

After that, the server MTSO requires the EPG data to the format converter.

As an answer for the EPG data request, the format converter provides the EPG data packet to the server MTSO. The server MTSO transmits the EPG data packet to the subscriber through the pertinent channel.

Herein, the EPG data packet can have the format agreed with the wireless internet network.

The EPG data packet received on the antenna 701 is decoded on the video encoding and decoding unit 704 through the video processing unit 707, the decoded result shows on the monitor 708 through the video processing unit 707. The subscriber answers it by searching the EPG data, and selects a channel.

In order to make possible the subscriber search, a web browser mean is provided on the terminal (processor) for searching the EPG and additional information.

The channel select information is inputted to the processor 709 through the key input unit 711, the processor 709 coding-controls the pertinent signal and transmits it to the server through the RF reception and transmission unit 702 and antenna 701.

The server MTSO requires the video and audio data corresponding to the selected channel by the subscriber to the format converter, the format converter outputs the video and audio data, and transmits it to the subscriber through the mobile communication network.

In order to watch the television broadcasting by using the mobile communication network, the transmitted television broadcasting signal is provided to the video encoding and decoding unit 704 through the antenna 701 and RF reception unit 702. As described above, the video encoding and decoding unit 704 performs the MPEG4 decoder function, accordingly decodes, outputs the video and audio to the monitor 708 and speaker SP through the each processing unit 707, 706.

Meanwhile, after the subscriber certification, the server can perform payment demand by using the subscriber certification key word such as an ID.

Herein, the television broadcasting signal transmission to the certain channel (changeable channel) opened and continued between the server and subscriber is described, but as described above, it is also possible to perform the television system using the mobile communication of the present invention by allotting a certain channel for the television broadcasting.

As described above in detail, the present invention is capable of watching moving picture by using the mobile communication network, watching the television broadcasting by using the mobile communication terminal, transmitting the EPG data for answering the subscriber request, and providing the selected broadcasting program from the data to the subscriber in a real time.

In addition, the subscriber can choose the television broadcasting and watch by using the mobile communication terminal such as the cellular phone, PCS, and IMT2000.

What is claimed is:

1. A digital video and audio data service system for a subscriber terminal using a mobile telecommunications network, comprising:
   a digital video and audio data receiver which receives digital video and audio data from a content provider;
   a format converter for converting the received digital video and audio data into format-converted data having a format that is compatible with the subscriber terminal;
   a medium storage for storing at least one of said received digital video and audio data and the format-converted data; and
   a transmitter which transmits the format-converted data via an allotted communication channel of the mobile telecommunications network,
   wherein the format converter comprises a transcoder which includes a decoding means which decodes the received digital video and audio data complying with a digital television broadcasting standard and then encodes the thusly decoded digital video and audio data into a format compatible with transmission over the allotted communication channel of the mobile telecommunications network, and a converting-controlling means which controls an encoding rate of the transcoder to comply with a transmission rate of the mobile telecommunications network.

2. The system of claim 1, wherein the digital video and audio data received from the content provider is related to digital television broadcast signals.

3. The system of claim 1, wherein the transmitter includes a means for putting the formatted digital video and audio signal onto the communication channel of the mobile telecommunications network, and a formatting-transmission means which formats and transmits the digital video and audio data with additional broadcasting information.

4. The system of claim 1, wherein the format converter converts the received digital video and audio data complying with a MPEG-2 standard into the format-converted data complying with at least one of MPEG-4, H.26L, H.263, and H.26X standards.

5. The system of claim 1, wherein the medium storage supports data storage techniques based upon at least one of a striping method and time-based data burst procedures using I-Frame value processing, Bit Rate Drop processing, and Macro Block and Intra/Inter compensation processing.

6. A method of receiving multimedia contents by a subscriber terminal, the method comprising:
   receiving signals and additional information from a broadcast content provider via a mobile telecommunications network, the signals and additional information having been converted into a format compatible with the mobile telecommunications network after decoding the received signals complying with a digital television broadcasting standard and then encoding the thusly decoded signals into a format compatible with transmission over a communication channel of the mobile telecommunications network, and controlling an encoding rate of to comply with a transmission rate of the mobile telecommunications network;
   receiving user selection of desired multimedia contents based on the received additional information;
   informing the broadcast content provider via the mobile telecommunications network about the user selection of desired multimedia contents; and
   receiving the desired multimedia contents from the broadcast content provider via a mobile telecommunications network.

7. The method of claim 6, wherein the signals and additional information received from the broadcast content provider comply with at least one of a ATSC standard, a DVB standard, an MPEG-2 standard, and an OFDM standard.

8. The method of claim 6, wherein the additional information is related to at least one of program system information (PSI), service guide information, subscriber billing, subscriber password and access rights management, and subscriber certification.

9. The method of claim 6, wherein the format compatible with the mobile telecommunications network comprises at least one of an MPEG-2 standard, an MPEG-4 standard, an H.26L standard, an H.263 standard, an H.26X standard, a WAP (Wireless Application Protocol) standard, a PSIP (Program Stream Internet Protocol) standard, a HDML (Handheld Device Mark-up Language) format, a TTML (Tagged Text Mark-up Language) format, HDTP (Handheld Device Transport Protocol) format, an ITTP (Intelligent Terminal Transfer Protocol) format, MHEG/XHTML (Multimedia and Hypermedia Expert Group/XHyper-Text Mark-up Language) format.

10. A method of receiving multimedia contents by a subscriber terminal, the method comprising:
    receiving signals and additional information from a broadcast content provider via a mobile communications network, the signals and additional information having been converted into a format compatible with the mobile communications network after decoding the received signals complying with a digital television broadcasting standard and then encoding the thusly decoded digital signals into a format compatible with transmission over a communication channel of the mobile telecommunications network, and controlling an encoding rate of to comply with a transmission rate of the mobile telecommunications network;
    displaying Electronic Program Guide (EPG) data to a subscriber of the subscriber terminal;
    receiving subscriber selection of desired multimedia contents based on the displayed EPG data;
    sending a request to the broadcast content provider in order to receive the desired multimedia contents selected by the subscriber from the displayed EPG data;
    receiving authentication from the mobile communications network in order to receive the desired multimedia contents selected by the subscriber; and
    receiving the desired multimedia contents from the broadcast content provider via a mobile communications network.

11. The method of claim 10, wherein the format compatible with the mobile telecommunications network comprises at least one of an MPEG-2 standard, an MPEG-4 standard, an H.26L standard, an H.263 standard, an H.26X standard, a WAP (Wireless Application Protocol) standard, a PSIP (Program Stream Internet Protocol) standard, a HDML (Handheld Device Mark-up Language) format, a TTML (Tagged Text Mark-up Language) format, HDTP (Handheld Device Transport Protocol) format, an ITTP (Intelligent Terminal Transfer Protocol) format, MHEG/XHTML (Multimedia and Hypermedia Expert Group/XHyper-Text Mark-up Language) format.

12. The method of claim 10, wherein the EPG data allows for broadcast schedule searching using keywords, program titles, actor names and other program related concepts.

13. The method of claim 10, wherein the authentication comprises at least one of subscriber billing, subscriber password and access rights management, and subscriber certification is performed via the mobile telecommunications network.

14. A digital broadcasting service system comprising:
- a digital television signal processing unit configured to perform demodulating, multiplexing and decoding of digital video and audio data, and to provide multiplexed output data and decoded output data;
- a media storage unit configured to receive and store information from the digital television signal processing unit;
- a data processing and converting unit configured to receive the decoded output data from the digital television signal processing unit, to perform further decoding and protocol conversion thereon, and to provide protocol-converted output data; and
- a transcoder and transmission unit configured to receive the multiplexed output data from the digital television signal processing unit, to retrieve the information stored in the media storage unit, and to receive the protocol-converted output data from the data processing and converting unit, and configured to perform transcoding, media synchronization, wireless data protocol processing and rate control thereon to provide wireless streaming outputs to a user who receives and reproduces the digital video and audio data via a mobile terminal compatible with a mobile telecommunications network.

15. The system of claim 14, wherein the protocol conversion involves conversion of the decoded output data that complies with a first MPEG standard into the protocol-converted output data that complies with a different MPEG standard.

16. The system of claim 14, wherein the protocol conversion involves conversion of among at least one of an MPEG-2 standard, an MPEG-4 standard, an H.26L standard, an H.263 standard, an H.26X standard, a WAP (Wireless Application Protocol) standard, a PSIP (Program Stream Internet Protocol) standard, a HDML (Handheld Device Mark-up Language) format, a TTML (Tagged Text Mark-up Language) format, HDTP (Handheld Device Transport Protocol) format, an ITTP (Intelligent Terminal Transfer Protocol) format, MHEG/XHTML (Multimedia and Hypermedia Expert Group/XHyper-Text Mark-up Language) format.

17. The system of claim 14, wherein the information from the digital television signal processing unit comprises EPG (Electronic Program Guide) data that allows for broadcast schedule searching using keywords, program titles, actor names and other program related concepts.

18. The system of claim 14, wherein the digital television signal processing unit, the media storage unit, the data processing and converting unit, and the transcoder and transmission unit further cooperate such that at least one of subscriber billing, subscriber password and access rights management, and subscriber certification is performed via the mobile telecommunications network.

19. The system of claim 14, wherein the media storage unit supports data storage techniques based upon at least one of a striping method and time-based data burst procedures using I-Frame value processing, Bit Rate Drop processing, and Macro Block and Intra/Inter compensation processing.

* * * * *